United States Patent
Lefebvre et al.

(10) Patent No.: US 7,636,095 B2
(45) Date of Patent: Dec. 22, 2009

(54) PIXEL DELTA INTERPOLATION METHOD AND APPARATUS

(75) Inventors: Laurent Lefebvre, Framingham, MA (US); Stephen L. Morein, Cambridge, MA (US); Jay C. Wilkinson, Newton, MA (US)

(73) Assignee: ATI Technologies, Inc., Markham, Ontario (CA)

( * ) Notice: Subject to any disclaimer, the term of this patent is extended or adjusted under 35 U.S.C. 154(b) by 367 days.

(21) Appl. No.: 10/236,089

(22) Filed: Sep. 6, 2002

(65) Prior Publication Data

US 2004/0046764 A1   Mar. 11, 2004

(51) Int. Cl.
*G09G 5/00* (2006.01)

(52) U.S. Cl. ..................................... 345/606

(58) Field of Classification Search ......... 345/581–582, 345/586, 428, 606–610; 358/428, 525; 708/290; 382/300
See application file for complete search history.

(56) References Cited

U.S. PATENT DOCUMENTS

| | | | | |
|---|---|---|---|---|
| 5,594,846 A * | 1/1997 | Donovan | .................... | 345/582 |
| 5,793,435 A * | 8/1998 | Ward et al. | .................. | 348/448 |
| 6,191,772 B1 * | 2/2001 | Mical et al. | ................. | 345/698 |
| 6,204,856 B1 * | 3/2001 | Wood et al. | .................. | 345/608 |
| 6,213,653 B1 * | 4/2001 | Borg et al. | ................... | 345/606 |
| 6,275,235 B1 * | 8/2001 | Morgan, III | ................. | 345/582 |
| 6,573,909 B1 * | 6/2003 | Nagao | ......................... | 715/727 |
| 6,654,492 B1 * | 11/2003 | Sasai | .......................... | 382/162 |
| 6,791,569 B1 * | 9/2004 | Millet et al. | ................. | 345/611 |
| 2003/0160799 A1 * | 8/2003 | Emberling et al. | .......... | 345/582 |

* cited by examiner

*Primary Examiner*—Aaron M Richer
(74) *Attorney, Agent, or Firm*—Vedder Price, P.C.

(57) ABSTRACT

A method for rendering an object including receiving a pixel tile representing a portion of a primitive to be rendered, determining attributes of a reference pixel within the pixel tile, and determining the attributes of neighboring pixels within the pixel tile based on barycentric differences relative to the reference pixel is disclosed. A circuit for calculating at least one attribute of an object to be rendered includes an initial calculation circuit providing full precision reference pixel attribute data in response to a pixel tile that defines at least a portion of the object; and a derivative circuit, operatively coupled to the initial calculation circuit, providing reduced precision neighboring pixel attribute data in response to the pixel tile. The derivative circuit includes a plurality of pixel attribute sub-circuits or components, which determine the attribute values of neighboring pixels within the pixel tile at a precision less than that of the precision used to define the reference pixel.

14 Claims, 5 Drawing Sheets

PIXEL DELTA INTERPOLATION METHOD AND APPARATUS

FIELD OF THE INVENTION

The present invention generally relates to image rendering and, more particularly, to the computation of attribute values of an object to be rendered.

BACKGROUND OF THE INVENTION

In computer graphics applications, complex shapes and objects are formed through the interconnection and rendering of more simple structures, referred to as primitives. An example of such a primitive is a triangle. Color, shading and/or texture are often added to the rendered object to make it look more realistic.

Primitives, and the attributes (i.e., color, shading, texture and other suitable attributes) they possess, are defined in part by the vertices thereof. Known techniques for shading an object, for example, include using attribute data values interpolated from the vertices of the primitive. A drawback associated with conventional interpolation techniques is that the interpolation must be performed on each individual pixel of the primitive. As interpolation is conventionally performed in hardware, this requires that many interpolation circuits be present on a single chip. The amount of real estate taken up by the interpolation circuits quickly becomes prohibitive.

In addition to the shading of the object, the angles or orientation of the rendered object on a (two-dimensional) screen is also important. Correct perspective mapping of a triangle, or other suitable primitive, requires the barycentric coordinates of each pixel to be operated on (e.g., multiplied) by corresponding weighing value at full precision. An example of such full precision calculation would be performing 32-bit arithmetic operations on every pixel of an image. Given the barycentric equation:

$$P = Ai + Bj + C$$

where "i" and "j" represent spatial locations, at least two 32-bit multiplications and two 32-bit additions are required to be performed on every pixel. As the number of pixels that form an image can be an arbitrarily large number, N, the number of components needed to map a perspectively correct two-dimensional image is equal to N (32-bit multipliers+32-bit adders). Each multiplier takes up valuable real estate on the integrated circuit chip upon which it is placed. Thus, the real estate penalty associated with conventional pixel attribute computation and rendering techniques is prohibitively large. Consequently, the cost of the integrated circuit chip which performs such operations may also be prohibitively large.

In addition to the space penalty discussed above, there is also a corresponding time (or efficiency) penalty associated with performing full precision calculations on each pixel of an image, as the larger the integrated circuit chip, the longer it takes the signal representing the data being operated on to be transmitted from input to output.

BRIEF DESCRIPTION OF THE DRAWINGS

The present invention and the associated advantages and features thereof will be best understood and appreciated upon review of the following detailed description of the invention, taken in conjunction with the following drawings, where like numerals represent like elements, in which.

DETAILED DESCRIPTION OF THE INVENTION

Briefly stated, the present invention is directed a method and circuit operative to calculate the attribute(s) of an object as it is rendered. Specifically, the present invention is directed to a method of determining the attributes of an object including receiving a pixel tile representing a portion of a primitive to be rendered; determining an attribute of a reference pixel within the pixel tile at full precision; and determining the attributes of the neighboring pixels within the pixel tile based on barycentric differences relative to the reference pixel.

A circuit for calculating at least one attribute of an object to be rendered includes an initial calculation circuit providing full precision reference pixel attribute data in response to a pixel tile that defines at least a portion of the object; and a derivative circuit, operatively coupled to the initial calculation circuit, providing reduced precision neighboring pixel attribute data in response to the pixel tile. The derivative circuit includes a plurality of pixel attribute sub-circuits or components, which determine the attribute values of neighboring pixels within the pixel tile at a precision less than that of the precision used to define the reference pixel.

By basing the interpolated pixel attribute(s) on the barycentric differences between the reference pixel and the neighboring pixels within the pixel tile, rendering accuracy is maintained as any movement of a pixel or image fragment within a pixel will be accounted for. In addition, calculating the attribute differences based on the reference pixel reduces the amount of on-chip space required for the attribute determination circuit, as a separate circuit is not required for each pixel being rendered.

As discussed above, conventional methods of mapping a perspectively correct primitive onto a two-dimensional space requires the barycentric coordinates of each pixel to be operated on by a corresponding weighing value at full precision. Such calculations require several 32-bit additions and multiplications per pixel which is computationally intensive. In contrast, the present invention provides a more robust and efficient attribute interpolation method as compared to conventional methods. The process is performed in hardware; thereby requiring no processor usage. In this fashion, the processor is freed up to perform other operations.

Figure 1A:
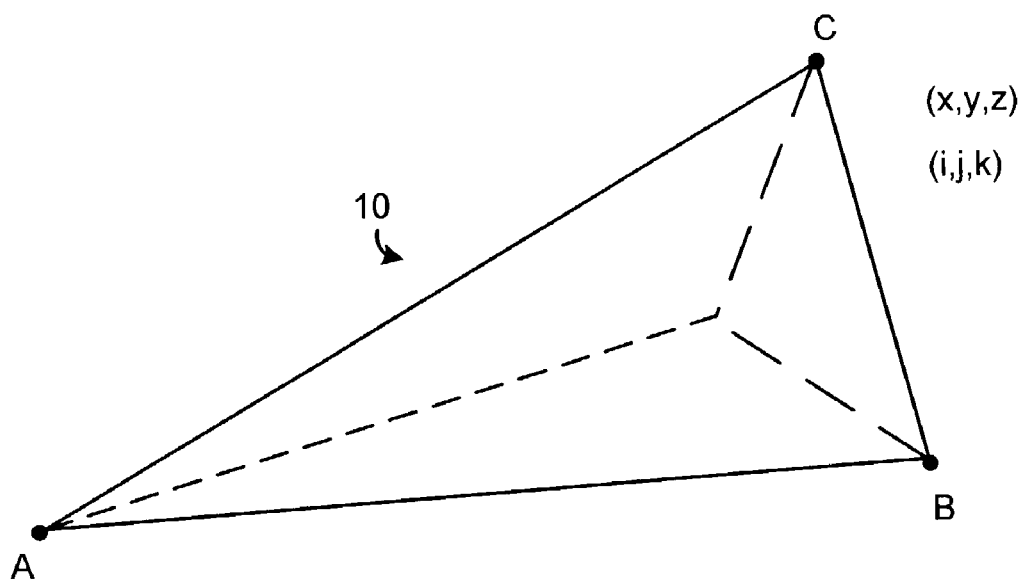
FIGS. 1(a)-1(b) illustrate a three-dimensional object being rendered onto a two-dimensional space.

FIG. 1(a) illustrates an exemplary three-dimensional object that is to be rendered on a two-dimensional space. As shown in FIG. 1(a) the three-dimensional object 10 is a pyramid having vertices (x, y, z), where each vertex has an associated attribute value (A, B, C). As known to those of ordinary skill in the art, the attribute value can represent the color, shading, or texture coordinates of the object.

Figure 1B:
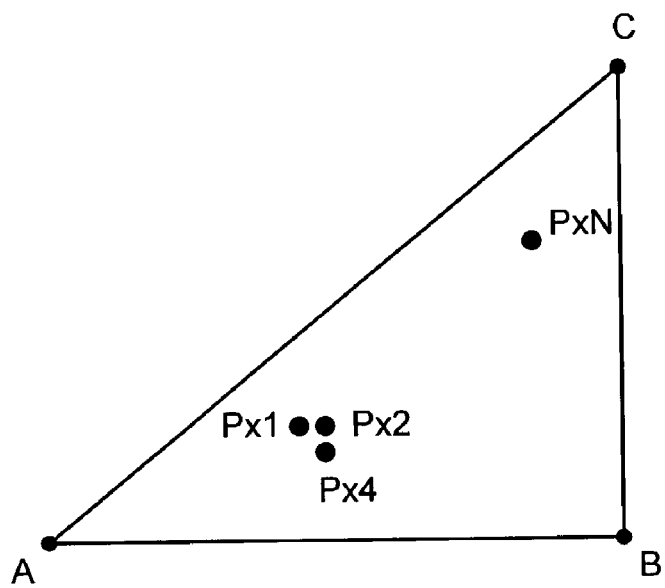

FIG. 1(b) illustrates a perspectively correct rendering of the three-dimensional object 10 illustrated in FIG. 1(a) onto a two-dimensional space. As illustrated in FIG. 1(b), in order to render a perspectively correct image of the object, the pixels that make up the object, must be rendered onto a two-dimensional screen. This is performed by converting the three-dimensional values of the image to a two-dimensional screen space, on a per pixel basis. This is represented by pixels Px1-PxN in FIG. 1(b). This invention takes advantage of the fact that the attribute of a given pixel, e.g., Px2, is related to the attributes of neighboring pixels (e.g., Px1 and Px4). Thus, the attribute value of any pixel to be rendered, is comprised of a combination of the attributes of the pixels that neighbor it.

Figure 2:
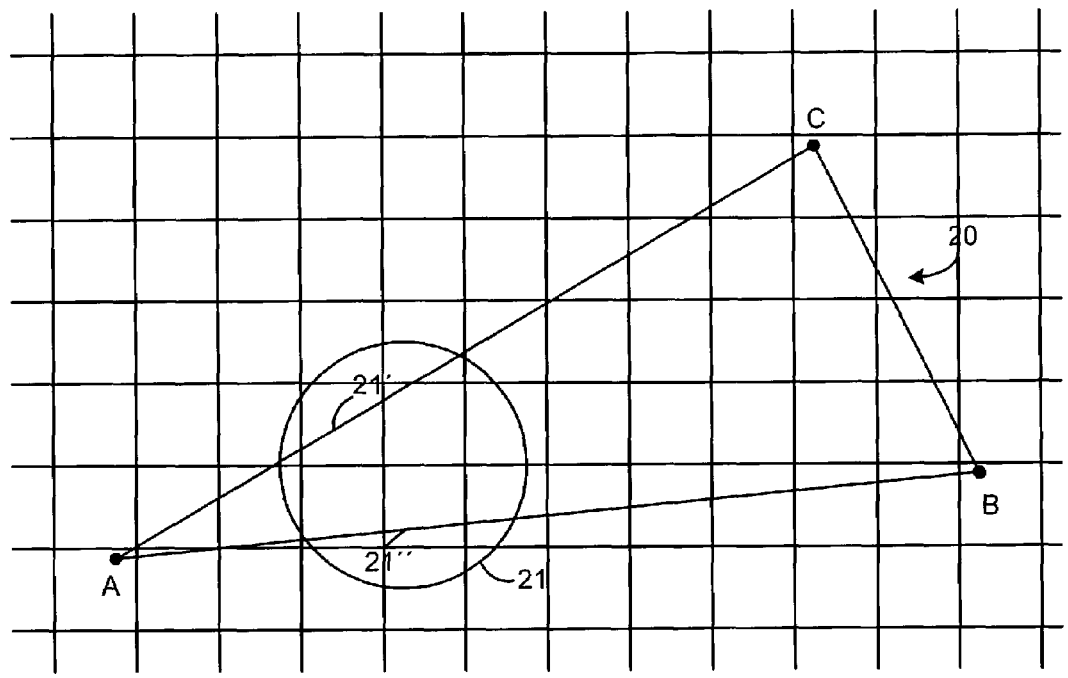
FIG. 2 is a schematic representation of a primitive being rendered onto a two-dimensional space.

For example, FIG. 2 is a schematic representation of a primitive 20 being rendered onto a two-dimensional space (shown as grid lines). The primitive 20 is a triangle having three vertices, with each vertex having a corresponding attribute value A–C. A portion of the primitive to be rendered 21 (shown encircled) will have attributes that are defined in part by the attribute values (A, B, C) presented at the vertices of the primitive. Thus, the rendering, or mapping, of the primitive 20 onto the two-dimensional screen space, requires the rendering of the individual pixels as encircled in 21. The present invention provides for a robust method of interpolating the attribute values of the primitive that is rendered by calculating the attributes of the rendered primitive on a tile basis. Such methodology will be described in greater detail with respect to FIGS. 3-5.

Figure 3:
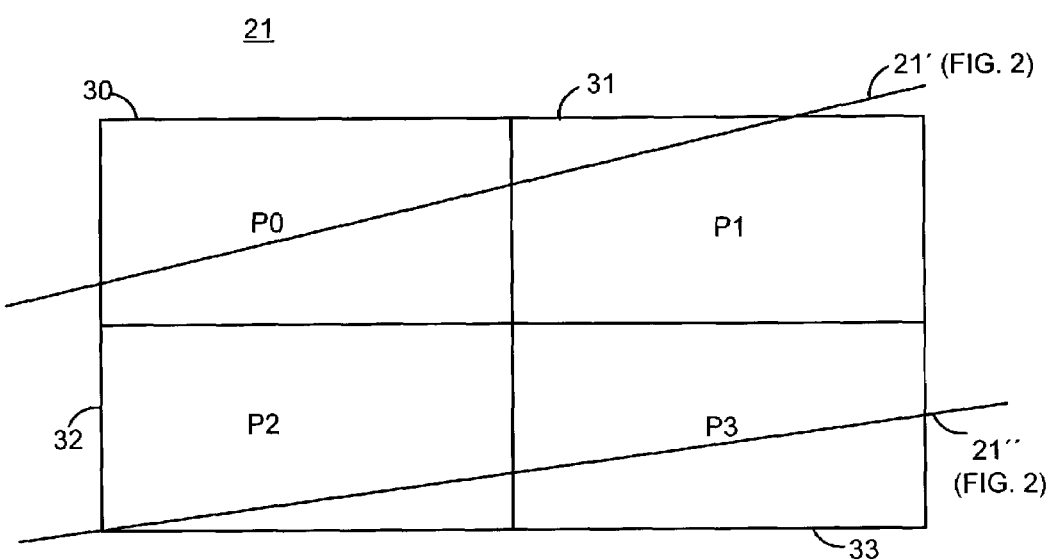
FIG. 3 is an exploded view of a pixel tile corresponding to a portion of a primitive to be rendered.

FIG. 3 is an exploded view of the pixel tile 21 corresponding to a portion of the primitive to be rendered. As illustrated in FIG. 3, the pixel tile 21 is formed of and includes four neighboring pixels (P0-P3). For purposes of illustration, the pixel tile 21 will be referred to as including a reference pixel P0 30, and three neighboring pixels. More specifically, pixel P1 31 will be defined as being the pixel in the upper right hand corner of pixel tile 21. Neighboring pixel P2 32 will be defined as being the pixel in the lower left hand corner of the pixel tile 21. Neighboring pixel P3 33, will be defined as being the pixel located in the lower right hand corner of pixel tile 21. Thus, in an exemplary embodiment of the present invention, a pixel tile is formed by a 2×2 matrix of pixels. However, it will be appreciated and understood by those of ordinary skill in the art, that a pixel tile can be representative of any M×N matrix of pixels; including tiles where M=N.

The portion of the primitive in pixel tile 21 to be rendered substantially includes the region within of two line segments 21' and 21" that pass through portions of pixels P0-P3. To render this portion of the primitive, the attribute value of the reference pixel, defined as being pixel P0 30, will be calculated at full precision. Then, the attributes of the neighboring pixels P1-P3 will be determined at reduced precision relative to the reference pixel. Taking advantage of the fact that the attribute values of the neighboring pixels P1-P3 will be interrelated, at least somewhat to the attribute value of the reference pixel, the attribute value of the reference pixel P0 30 will be used to calculate the corresponding attribute values of the neighboring pixels P1-P3.

Figure 4:
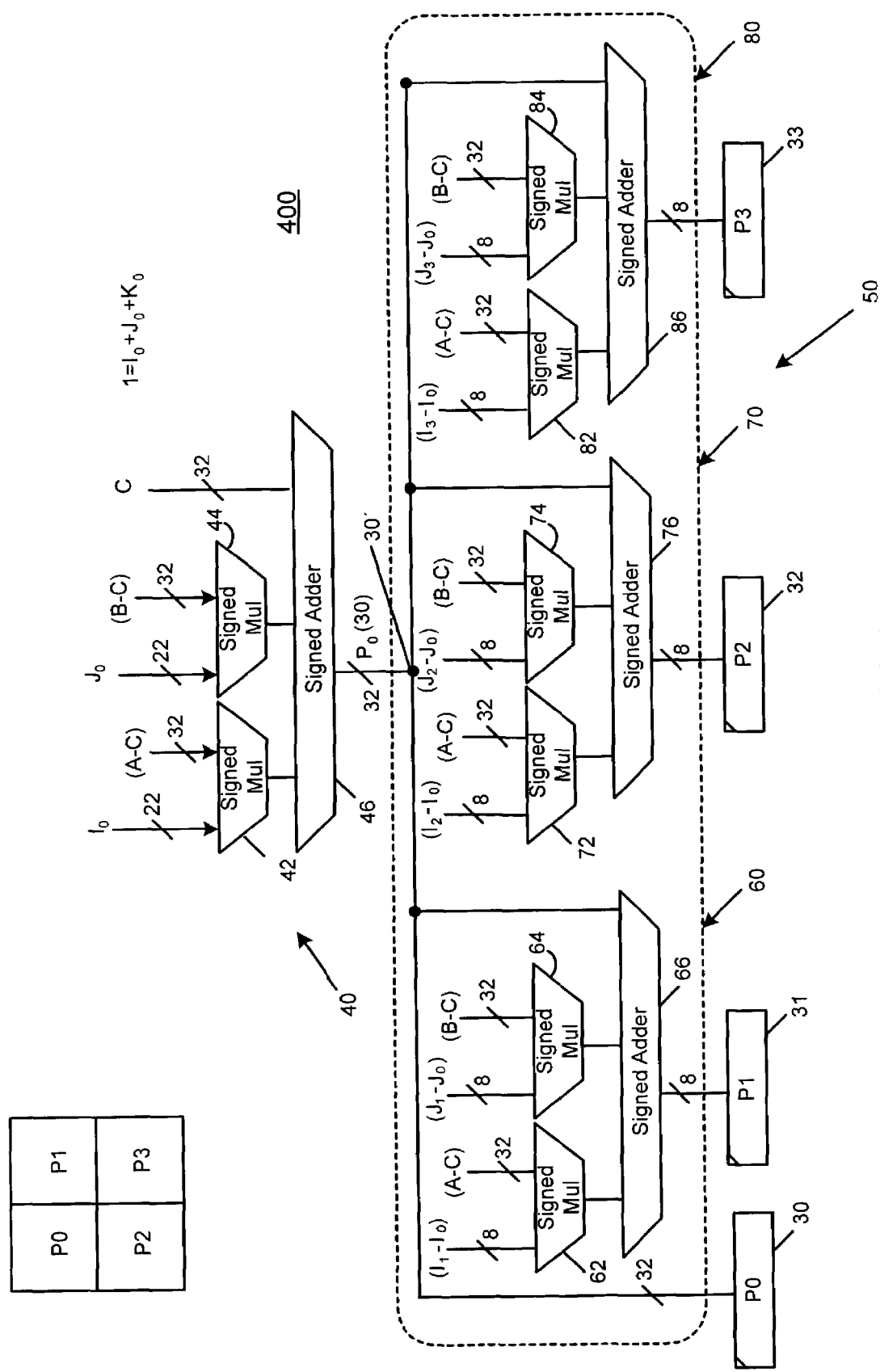
FIG. 4 is a schematic block diagram of the circuit used to perform the pixel attribute interpolation determination according to the present invention.
Figure 5A:
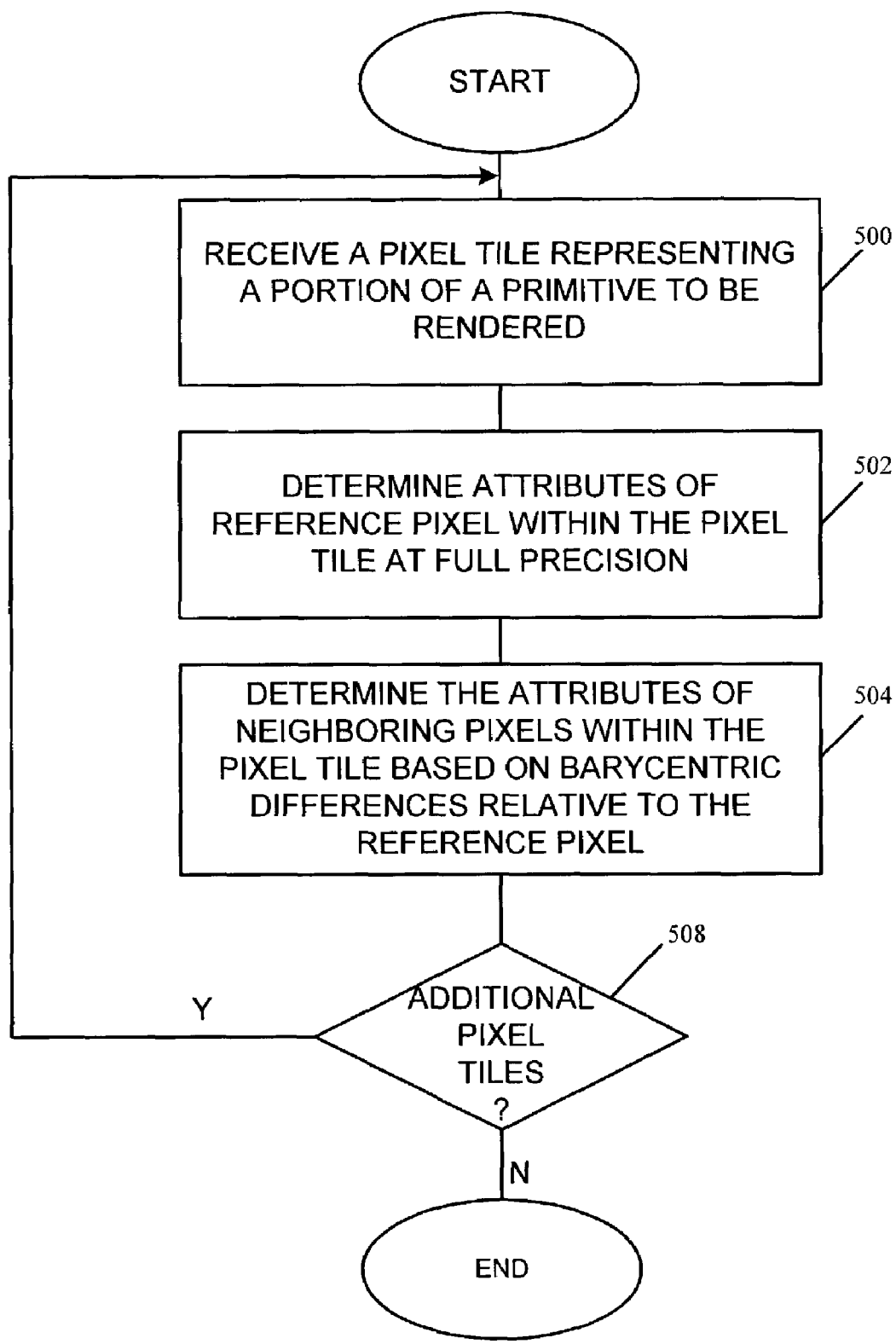
FIGS. 5A-5B illustrate the operations performed by the circuit illustrated in FIG. 4 when performing pixel attribute interpolation according to the present invention.

FIG. 4 is a schematic block diagram of the circuit used to perform the pixel interpolation operation according to the present invention. The attribute interpolation circuit 400 can be employed as part of a graphics processor or rendering engine or as a stand alone piece of hardware. In addition, equivalent computational functionality can be designed from and implemented in software which may be executed on a suitable processing device (not shown). Thus, both hardware and software implementations of the attribute interpolation circuit 400 are contemplated by and are within the scope and spirit of the present invention. The attribute interpolation circuit 400 includes an initial calculation circuit 40, which determines the attribute value to be applied to the reference pixel P0 30 and a derivative circuit 50, including a plurality of sub-circuits or computation circuits 60, 70, 80 which determine the attribute value to be applied to the pixels that neighbor the reference pixel. The derivative circuit 50 is coupled to the initial calculation circuit 40 at node 30', which provides the attribute value of the reference pixel P0 30.

The initial calculation circuit 40 performs a full precision (i.e., 32-bit) attribute determination operation on the reference pixel P0 30, as provided below in equation 1:

$$P0 = I_0(A-C) + J_0(B-C) + C \quad (1)$$

where $I_0$ is the barycentric coordinate of reference pixel P0 30 associated with the vertex having parameter A (FIG. 2); $J_0$ is the barycentric coordinate of reference pixel P0 30 associated with vertex having parameter B (FIG. 2); and A, B and C are the attribute values at the vertices of the object primitive being rendered. Note that there is no need for the barycentric coordinate $K_0$ of pixel P0 30 associated with the vertex having parameter C (FIG. 2) because the interpolation equation has been reordered in such a fashion as to remove a 32-bit signed multiplication. Accordingly, the initial calculation circuit 40 includes a first 32-bit signed multiplication circuit 42, a second 32-bit signed multiplication circuit 44 and a 32-bit signed floating point addition circuit 46.

The first signed multiplication circuit 42 receives as inputs barycentric coordinate $I_0$ and a value representing the difference between vertex attribute values A and C of the primitive. The output of the first signed multiplication circuit 42 is provided as a first input to the signed addition circuit 46. The second signed multiplication circuit 44 receives as inputs, barycentric coordinate $J_0$ and a value representing the difference between vertex attribute values B and C of the primitive. The output of the second signed multiplication circuit 44 is provided as a second input to the signed addition circuit 46. The third input to addition circuit 46 is provided by the vertex attribute value C. The output of the signed addition circuit 46 represents the full (e.g. 32-bit) precision attribute value of the reference pixel P0 30. This value is provided at node 30' for further use by the attribute interpolation circuit 400.

The derivative circuit 50 is comprised of a series of sub-circuits 60, 70 and 80, that determine the attribute values of the neighboring pixels P1-P3, respectively at reduced (e.g. 8-bit) precision. Although three sub-circuits are shown, it will be appreciated by those skilled in the art that the larger the tile size, the greater the number of sub-circuits employed in the derivative circuit 50 and the higher the precision needed. According to the present invention, if there are N pixels in the pixel tile 21 (FIG. 3) the derivative circuit 50 will include N−1 sub-circuits. By calculating the attribute values of the neighboring pixels at reduced precision, fewer calculations and fewer circuit components are required; thereby, requiring less chip real estate. In addition, throughput efficiency is also enhanced as there are fewer components in the present design between input and output.

The first sub-circuit 60 performs a reduced precision determination of the attribute value of pixel P1 31, based on equation 2:

$$P1 = P0 + \Delta 01I(A-C) + \Delta 01J(B-C) \quad (2)$$

where P0 is the full precision attribute value of the reference pixel 30 present at node 30'; $\Delta 01I$ represents the difference in barycentric coordinates along I between reference pixel P0 30 and neighboring pixel P1 31; (A−C) represents the difference between vertex attribute values A and C; $\Delta 01J$ represents the difference in barycentric coordinates along J between reference pixel P0 30 and neighboring pixel P1 31; and (B−C) represents the difference between the attribute values B and C. Thus, the attribute value of neighboring pixel P1 31 is interpolated (e.g. calculated) based on the barycentric difference between the reference pixel and the neighboring pixel. By basing the interpolated pixel attribute value on the differences in barycentric coordinates between the reference pixel and a neighboring pixel within a pixel tile, rendering accuracy is maintained as any movement of a pixel or image fragment within a pixel will be accounted for.

The first sub-circuit 60 includes a first signed multiplication circuit 62, a second signed multiplication circuit 64 and a signed addition circuit 68. The first signed multiplication circuit 62 receives as inputs an 8-bit value $(I_1-I_0)$ representing the barycentric difference along I between the reference pixel P0 30 and the neighboring pixel P1 31. The second input to the first signed multiplication circuit 62 is a value corresponding to the difference between vertex attribute values A and C. The output of the first signed multiplication circuit 62 is provided as a first input to signed addition circuit 66.

The second signed multiplication circuit 64 receives as inputs an 8-bit value $(J_1-J_0)$ representing the barycentric difference along J between a reference pixel P0 30 and the neighboring pixel P1 31. The second input to the signed multiplication circuit 64 is a value corresponding to the difference between vertex attribute values B and C. The output of the second signed multiplication circuit 64 is provided as the second input to the signed addition circuit 66. The third input to the addition circuit 66 is the attribute value of the reference pixel P0 30. The output of the addition circuit 66 represents the attribute value of pixel P1 31.

The second sub-circuit 70 performs a reduced precision determination of the attribute value of pixel P2 32, based on equation 3:

$$P2 = P0 + \Delta 02I(A-C) + \Delta 02J(B-C) \quad (3)$$

where P0 is the full precision attribute value of the reference pixel P0 30 present at node 30'; Δ02I represents the difference in barycentric coordinates along I between reference pixel P0 30 and neighboring pixel P2 32; (A–C) represents the difference between vertex attribute values A and C; Δ02J represents the difference in barycentric coordinates along J between reference pixel P0 30 and pixel P2 32; and (B–C) represents the difference between vertex attribute values B and C. Thus, the calculated attribute value of pixel P2 32 is interpolated based on the barycentric differences between the reference pixel P0 30 and the neighboring pixel (in the lower left hand corner) P2 32.

The second sub-circuit 70 includes a first signed multiplication circuit 72, a second signed multiplication circuit 74 and a signed addition circuit 76. The first signed multiplication circuit 72 receives as inputs an 8-bit value $(I_2-I_0)$ representing the barycentric difference along I between the reference pixel P0 30 and the neighboring pixel P2 32. The second input of the first signed multiplication circuit 72 is a value corresponding to the difference between vertex attribute values A and C. The output of the first signed multiplication circuit 72 is provided as a first input to signed addition circuit 76. The second signed multiplication circuit 74 receives as inputs an 8-bit value $(J_2-J_0)$ representing the barycentric difference along J between the reference pixel P0 30 and the neighboring pixel P2 32. The second input to the second signed multiplication circuit 74 is a value corresponding to the difference between vertex attribute values B and C. The output of the second signed multiplication circuit 74 is provided as the second input to the signed addition circuit 76. The third input to the signed addition circuit 76 is the attribute value of the reference pixel P0 30 from node 30'. The output of the addition circuit 76 represents the attribute value of neighboring pixel P2 32.

The third sub-circuit 80, performs a reduced precision determination of the attribute value P3 33, based on equation 4 below:

$$P3 = P0 + \Delta 03I(A-C) + \Delta 03J(B-C) \quad (4)$$

where P0 is the full precision attribute value of the reference pixel P0 30 present at node 30'; Δ03I represents the difference in barycentric coordinates along I between reference pixel P0 30 and neighboring pixel P3 33; (A–C) represents the difference between vertex attribute values A and C; Δ03J represents the difference in barycentric coordinates along J between reference pixel P0 30 and neighboring pixel P3 33; and (B–C) represents the difference between vertex attribute values B and C. Thus, the calculated attribute value of pixel P3 33 is interpolated based on the barycentric differences between the reference pixel P0 30 and the diagonal neighboring pixel (lower right hand corner) P3 33.

The third sub-circuit 80 includes a first signed multiplication circuit 82, a second signed multiplication circuit 84 and a signed addition circuit 86. The first signed multiplication circuit 82 receives as inputs an 8-bit value $(I_3-I_0)$ representing the barycentric differences along I between the reference pixel P0 30 and the neighboring pixel P3 33. The second input to the first signed multiplication circuit 82 is a value corresponding to the difference between vertex attribute values A and C. The output of the first signed multiplication circuit 82 is provided as a first input to signed addition circuit 86.

The second signed multiplication circuit 84 receives as input an 8-bit value $(J_3-J_0)$ representing the barycentric difference along J between a reference pixel P0 30 and the neighboring pixel P3 33. The second input to the second signed multiplication circuit 84 is a value corresponding to the difference between vertex attribute values B and C. The output of the second signed multiplication circuit 84 is provided as a second input to the signed addition circuit 86. The third input to the signed addition circuit 86 is the attribute value of the reference pixel P0 30 at node 30'. The output of the signed addition circuit 86 represents the attribute value of diagonal neighboring pixel P3 33.

The operations performed by the attribute interpolation circuit 400 to determine the attribute of a pixel tile will now be discussed with reference to FIG. 5. The process starts at step 500, where the attribute interpolation circuit 400 receives a pixel tile 21 representing a portion of the primitive (represented by the region within lines 21' and 21" in FIG. 3) to be rendered. Also in step 500, the reference pixel is selected. According to an exemplary embodiment of the present invention, the pixel in the upper left hand corner of the pixel tile is designated as the reference pixel (P0).

In step 502, the full precision attribute value of the reference pixel P0 30 is determined by the initial calculation circuit 40 performing the calculation represented by equation 1. Thus, the attribute of that portion of the primitive that intersects reference pixel P0 30 is determined at full precision.

Figure 5B:
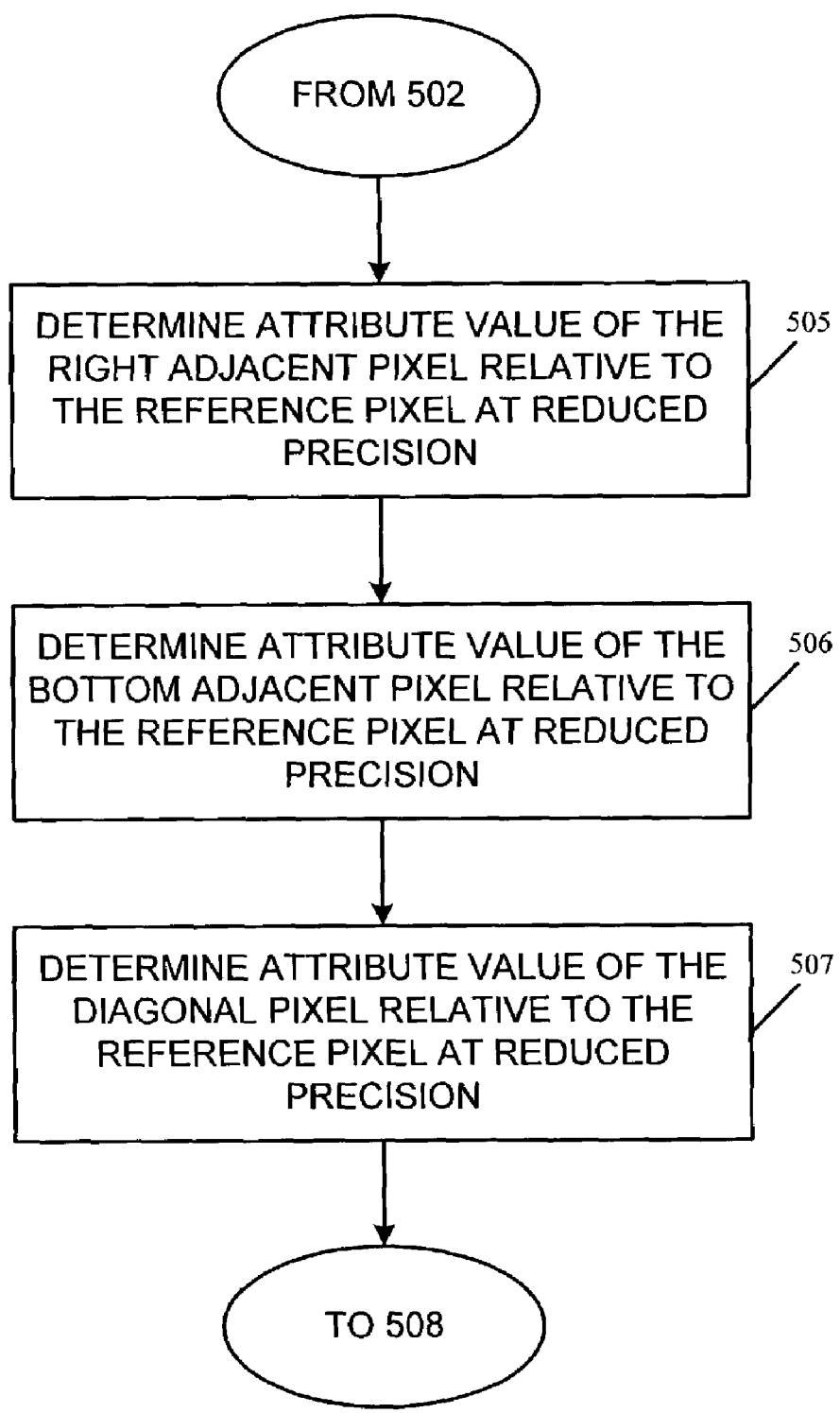

In step 504 the attributes of the neighboring pixels within the pixel tile are determined based on the barycentric differences relative to the reference pixel. The attributes of the neighboring pixels are determined at reduced precision relative to the reference pixel. The operations performed in step 504 are discussed in greater detail with reference to FIG. 5B. Referring briefly to FIG. 5B, in step 505, the attribute value of the right adjacent pixel P1 31 is determined. This attribute determination is performed in the derivative circuit 50 by the first sub-circuit 60 performing the calculation represented by equation 2. Thus, the attribute of that portion of the primitive that intersects pixel P1 31 is determined relative to the reference pixel P0 30.

In step 506 the attribute value of bottom adjacent pixel (e.g. lower left hand corner) P2 32 is determined at reduced precision. This determination is performed in the derivative circuit 50 by the second sub-circuit 70 performing the calculation represented by equation 3. Thus, the attribute of that portion of the primitive that intersects pixel P2 32 is determined relative to the reference pixel P0 30.

In step 507, the attribute value of diagonal pixel (e.g. lower right hand corner) P3 33 is determined at reduced precision. This attribute determination is performed in the derivative circuit 50 by the third sub-circuit 80 performing the calculation represented in equation 4. Thus, the attribute of that portion of the primitive that intersects pixel P3 33 is determined relative to the reference pixel P0 30. After the attribute values of the individual pixels that comprise the pixel tile 21 have been determined, that portion of the primitive (bounded by lines 21' and 21") is then mapped onto the two-dimensional space, through any of the plurality of techniques known in the art.

Referring back to FIG. 5A, in step 508 after the primitive has been mapped, a determination is made as to whether an additional or new pixel tile has been received. If a new pixel tile has been received, the process moves back to step 500 where the determination of the attributes of the pixels contained within the new pixel tile is initiated. If a new pixel tile has not been received, the process ends.

By employing the attribute interpolation circuit 400, operating according to the present invention, the rendering accuracy of the resulting pixels is enhanced as any movement of a pixel or image fragment within the pixel tile is maintained as the attribute values of the pixels are determined with respect to the differences in barycentric coordinates between the reference pixel and the corresponding neighboring pixel.

The above detailed description of the invention and the examples described therein have been provided for the purposes of illustration and description. It is therefore contemplated that the present invention cover any and all modifications, variations or equivalents that fall within the spirit and scope of the basic underlying principles disclosed and claimed herein.

What is claimed is:

1. A method for rendering an object, comprising:
   receiving, by a circuit, a pixel tile representing a portion of a primitive to be rendered;
   interpolating, by said circuit, an attribute of a reference pixel within the pixel tile; and
   interpolating, by said circuit, an attribute of a neighboring pixel within the pixel tile based at least on barycentric coordinate value differences between the reference pixel and the neighboring pixel.

2. The method of claim 1, further including rendering the reference pixel by mapping the reference pixel onto a two-dimensional space.

3. The method of claim 2, further including rendering the reference pixel by mapping the neighboring pixel within the pixel tile onto the two-dimensional space based, in part, on the interpolated attribute of the neighboring pixel.

4. The method of claim 1, wherein the reference pixel is interpolated at full precision and the neighboring pixel attribute is interpolated at a precision level less than full precision.

5. The method of claim 1, wherein:
   the primitive has a first vertex, a second vertex and a third vertex; and
   interpolating the attribute of the neighboring pixel within the pixel tile is further based on:
   a vertex attribute value difference between the first vertex and the second vertex;
   a vertex attribute value difference between the second vertex and the third vertex; and
   the interpolated reference pixel attribute.

6. The method of claim 1, further comprising, for each additional pixel within the pixel tile, interpolating an additional attribute based at least on barycentric coordinate value differences between the reference pixel and the corresponding additional pixel.

7. The method of claim 6, wherein each additional pixel attribute is interpolated at a precision level less than full precision.

8. The method of claim 1, wherein interpolating the attribute of the neighboring pixel within the pixel tile based at least on barycentric coordinate value differences between the reference pixel and the neighboring pixel comprises:
   determining the barycentric coordinate value differences between the reference pixel and the neighboring pixel along a first barycentric coordinate axis; and
   determining the barycentric coordinate value differences between the reference pixel and the neighboring pixel along a second barycentric coordinate axis.

9. A method of rendering an object comprising:
   receiving, by a circuit, a plurality of pixels representing a portion of an object to be mapped;
   interpolating, by said circuit, at full precision, an attribute of a reference pixel within the plurality of pixels; and
   interpolating, by said circuit, at reduced precision, an attribute for each other pixel within the plurality of pixels based at least on the interpolated attribute of the reference pixel, wherein said full precision is an X-bit precision, said reduced bit precision is an Y-bit precision, wherein X is greater than Y, and wherein interpolating, at reduced precision, comprises determining barycentric coordinate value differences between the reference pixel and each other pixel within the plurality of pixels.

10. The method of claim 9, further including rendering the reference pixel by mapping the reference pixel onto a two-dimensional space based on the interpolated attribute of the reference pixel and rendering the remainder of the plurality of pixels by mapping the remainder of the plurality of pixels onto the two-dimensional space based on the interpolated attributes of each other pixel within the plurality of pixels.

11. The method of claim 9, wherein each other pixel within the plurality of pixels is adjacent to the reference pixel.

12. A processing circuit comprising:
   an initial calculation circuit operative to interpolate, at full precision, an attribute of a reference pixel of a pixel tile that defines at least a portion of an object to be rendered; and
   a derivative circuit, operatively coupled to the initial calculation circuit, comprising a plurality of sub-circuits each operative to interpolate, at a reduced precision, an attribute of a corresponding neighboring pixel, wherein the interpolated attribute of the reference pixel and each interpolated attribute of the corresponding neighboring pixel is mapped to an appropriate image space, wherein said full precision is an X-bit precision, said reduced bit precision is an Y-bit precision, and wherein X is greater than Y, wherein each of the plurality of sub-circuits is operative to interpolate the attribute of the corresponding neighboring pixel based at least on barycentric coordinate value differences between the reference pixel and the corresponding neighboring pixel.

13. The circuit of claim 12, wherein the derivative circuit includes N−1 sub-circuits, where N equals the number of pixels in the pixel tile.

14. A processing circuit comprising:
an initial calculation circuit operative to interpolate, at full precision, an attribute of a reference pixel of a pixel tile that defines at least a portion of an object to be rendered; and a derivative circuit, operatively coupled to the initial calculation circuit, comprising a plurality of sub-circuits each operative to interpolate, at a reduced precision, an attribute of a corresponding neighboring pixel, wherein the interpolated attribute of the reference pixel and each interpolated attribute of the corresponding neighboring pixel is mapped to an appropriate image space, wherein each of the plurality of sub-circuits is operative to interpolate the attribute of the corresponding neighboring pixel based at least on barycentric coordinate value differences between the reference pixel and the corresponding neighboring pixel, and wherein:
the pixel tile is part of a primitive having a first vertex, a second vertex and a third vertex; and
each of the sub-circuits comprises:
at least one signed multiplication circuit operative to:
multiply the barycentric coordinate value differences between the reference pixel and the corresponding neighboring pixel along a first barycentric coordinate axis and a vertex attribute value difference between the first vertex and the second vertex to generate a first signed multiplication circuit output; and
multiply the barycentric coordinate value differences between the reference pixel and the corresponding neighboring pixel along a second barycentric coordinate axis and a vertex attribute value difference between the second vertex and the third vertex to generate a second signed multiplication circuit output;
and
an addition circuit for adding the first signed multiplication circuit output, the second signed multiplication circuit output and the interpolated attribute of the reference pixel.

* * * * *

UNITED STATES PATENT AND TRADEMARK OFFICE
CERTIFICATE OF CORRECTION

PATENT NO. : 7,636,095 B2  Page 1 of 1
APPLICATION NO. : 10/236089
DATED : December 22, 2009
INVENTOR(S) : Lefebvre et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 603 days.

Signed and Sealed this

Twenty-first Day of December, 2010

David J. Kappos
*Director of the United States Patent and Trademark Office*